Figure 1:
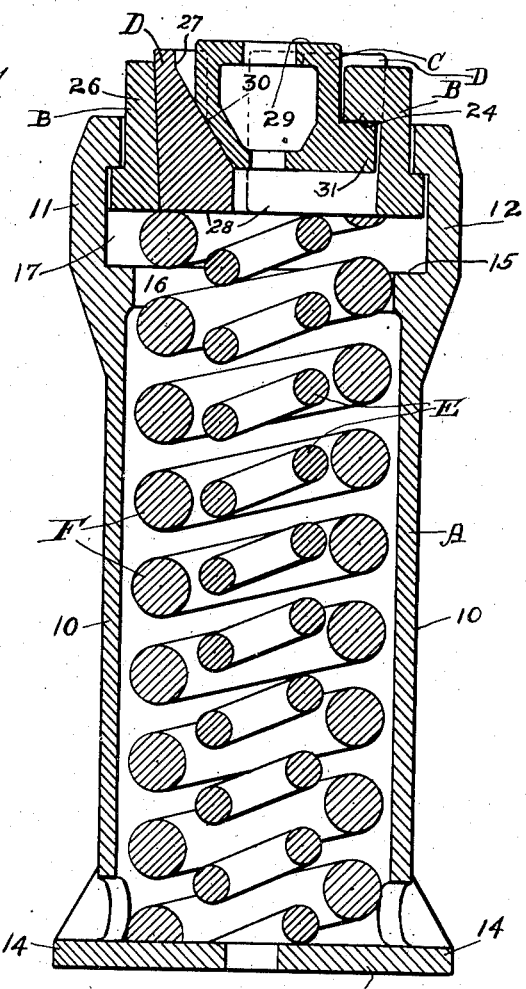

July 12, 1949.  H. J. LOUNSBURY  2,475,670

FRICTION SHOCK ABSORBING MECHANISM

Filed Nov. 1, 1945  2 Sheets-Sheet 1

Inventor:
Harvey J. Lounsbury.
By Henry Fuchs
Atty.

July 12, 1949.  H. J. LOUNSBURY  2,475,670
FRICTION SHOCK ABSORBING MECHANISM
Filed Nov. 1, 1945  2 Sheets-Sheet 2
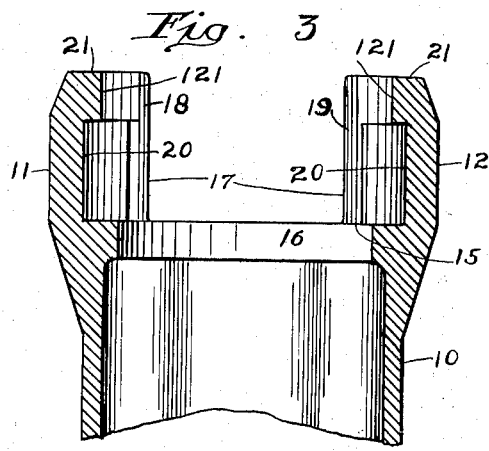
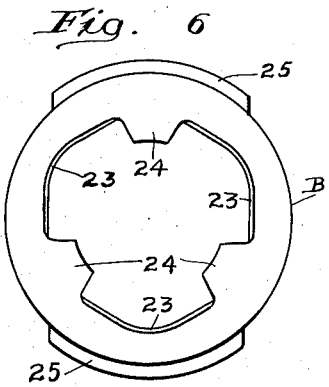
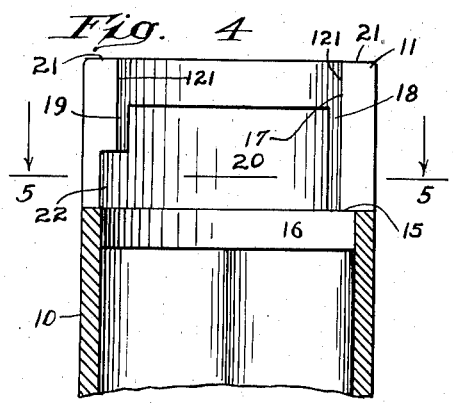
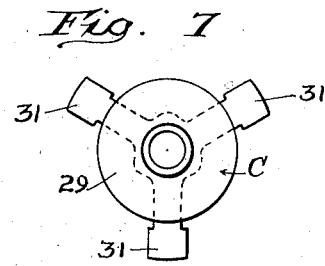
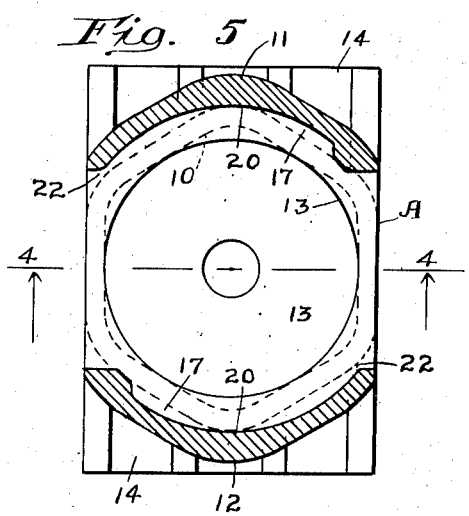
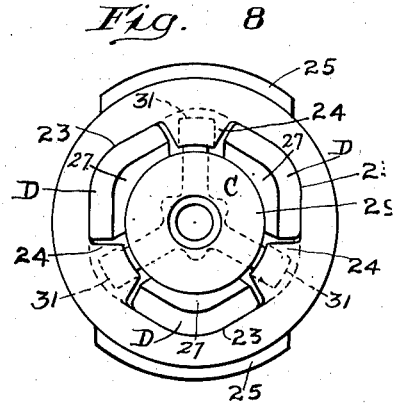
Inventor:
Harvey J. Lounsbury.
By Henry Fuchs
Atty.

Patented July 12, 1949

2,475,670

UNITED STATES PATENT OFFICE 2,475,670

FRICTION SHOCK ABSORBING MECHANISM

Harvey J. Lounsbury, Glen Ellyn, Ill., assignor to W. H. Miner, Inc., Chicago, Ill., a corporation of Delaware Application November 1, 1945, Serial No. 626,087

6 Claims. (Cl. 213—22)

This invention relates to improvements in friction shock absorbing mechanisms.

One object of the invention is to provide a friction shock absorbing mechanism, especially adapted for railway draft riggings, having free spring capacity to absorb the usual lighter shocks encountered in service, and high frictional resistance to absorb the heavier shocks, and having great column strength under full compression.

A further object of the invention is to provide a friction shock absorbing mechanism comprising a spring cage, a friction shell telescoped within the cage and having lengthwise movement with respect thereto, limited to less than the full compression stroke of the device, a friction clutch having sliding frictional engagement with the friction shell, and a helical coil spring resistance means within the cage yieldingly opposing inward movement of the clutch and friction shell, wherein the friction shell is connected to the cage by radial flanges thereon working within lengthwise extending guideways on the cage to guide the shell, having shouldered engagement with limiting stops on the cage, and engageable within the guides in back of the stops by a partial turn of the shell, and wherein the flanges of the shell are held against rotation about the longitudinal central axis of the mechanism during relative lengthwise movement of the shell and cage to prevent accidental disengagement of the parts.

A more specific object of the invention is to provide a friction shock absorbing mechanism, as set forth in the preceding paragraph, wherein the flanges of the shell project radially therefrom and each flange is engaged between laterally spaced, lengthwise extending, opposed guide walls defining each guideway, one of the walls being cut away or interrupted at its rear end to provide an inlet to permit rotary engagement of the shell with the cage and rotary disengagement therefrom, and the other or opposed wall being uninterrupted to provide continuous guide means against which the corresponding side edge of the flange shoulders, and wherein the arrangement of the parts is such that the helical coil spring resistance means exerts a rotary force in a direction reverse to the direction of disengagement of the shell, which force is imparted to the shell, counteracting any tendency of the same to be turned in disengaging direction, and maintaining the flange of the shell in guiding contact with the uninterrupted wall of the guideway.

Still another object of the invention is to provide a mechanism as hereinbefore set forth, wherein inward movement of the friction shell with respect to the cage is positively limited after the mechanism has been compressed to a predetermined extent, to compel relative movement of the friction clutch with respect to the shell during further compression of the device, by shouldered engagement of the shell with relatively wide abutment shoulders on the cage to provide great column strength, and wherein the shell is held against accidental rotation when the flanges thereof reach their position of alignment with respect to the inlet openings of the guideways, due to frictional contact between the inner end of the shell and the relatively wide abutment shoulders of the cage, produced by the pressure exerted on the shell during compression of the mechanism, thereby providing an additional safeguard against accidental turning and disengagement of the shell.

Other objects of the invention will more clearly appear from the description and claims hereinafter following.

Figure 2:
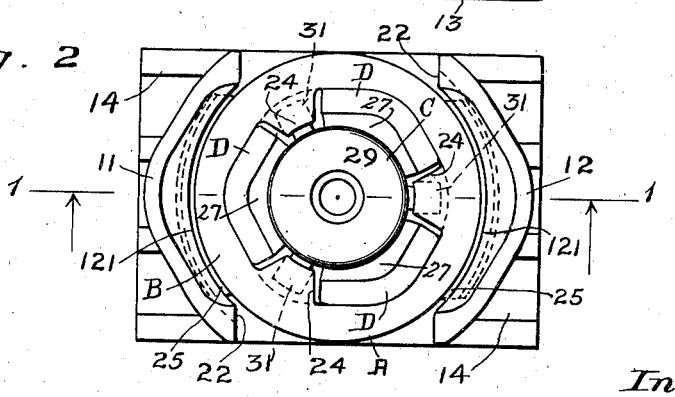

In the drawings forming a part of this specification, Figure 1 is a transverse, vertical sectional view of my improved friction shock absorbing mechanism, corresponding substantially to the line 1—1 of Figure 2. Figure 2 is a top plan view of Figure 1. Figure 3 is a view, similar to Figure 1, of the upper end portion of the spring cage of my improved mechanism, with the friction clutch and springs omitted. Figure 4 is a transverse, vertical sectional view on a plane at right angles to the plane of the sectional view in Figure 3, and corresponding substantially to the line 4—4 of Figure 5. Figure 5 is a transverse sectional view, corresponding substantially to the line 5—5 of Figure 4. Figure 6 is a plan or front end view of the friction shell of my improved mechanism. Figure 7 is a plan or front end view of the wedge block of my improved mechanism. Figure 8 is a plan or front end view of the assembled friction shell and clutch of my improved mechanism.

My improved friction shock absorbing mechanism, as shown in the drawings, comprises broadly a spring cage A; a friction shell B connected to the spring cage for limited inward and outward movement; a friction clutch, comprising a central wedge block C and three friction shoes D—D—D slidable in the friction shell; and a set of springs E and F within the spring cage, yieldingly opposing inward movement of the clutch and friction shell.

The spring cage A comprises a tubular casing 10 having laterally spaced, opposed, forwardly projecting arms 11 and 12 at its outer or upper end. The casing 10, as shown, is of hexagonal, transverse cross section and has a transverse wall 13 closing the rear or bottom end thereof. The wall 13 is laterally extended to provide flanges 14—14, which, together with the wall 13, form an integral follower member of the spring cage. At the top or front end, the casing member of the spring cage is provided with a continuous, inturned flange 15, defining a circular opening 16 of relatively large diameter. The flange 15 provides a relatively wide abutment shelf which acts as a limiting stop for inward movement of the friction shell B. The projecting arms 11 and 12 are laterally outwardly offset with respect to the casing portion 10 of the spring cage, the walls of the casing being suitably thickened at the inner ends of the arms, as clearly shown in Figures 1 and 3. The outer side of each arm is of V-shaped contour, the converging faces of the surface thereof being continuations of the outer faces of the corresponding two adjacent side walls of the hexagonal casing 10. On the inner side, each arm is provided with a lengthwise extending, relatively wide guideway 17 defined by spaced side walls 18 and 19 and a curved rear wall 20 between said side walls. The guideway 17 is closed at its front end by a transverse wall which is in the form of an inturned stop flange 21. The inner edge face of the stop flange 21, which face is indicated by 121, is of arc-shaped form, the opposed edges 121—121 of the two arms being concentric, as clearly shown in Figure 2. The wall 18 of the guideway 17 is continuous, extending to the flange 15 of the cage, but the wall 19 is interrupted, being cut away at its rear end to provide a laterally extending inlet opening 22 for a purpose hereinafter described. As will be evident, the flange 15 forms the inner, transverse end wall of each guideway 17 and provides a rear stop for the friction shell B.

As clearly shown in Figures 2, 3, 4 and 5 of the drawings, the guideways 17—17 of the arms 11 and 12 are in transverse alignment, but reversely arranged, that is, the inlet openings 22—22 of said guideways are at opposite sides of the spring cage, the inlet opening of the arm 11 being at the left hand side of the cage, as shown in Figure 5, and that of the arm 12 being at the right hand side.

The friction shell B is in the form of a tubular member of substantially cylindrical, exterior shape, open at its front and rear ends, and is of such external diameter as to slidingly fit between the curved edges 121—121 presented by the flanges 21—21 of the arms 11 and 12 of the spring cage. The interior of the shell B is of substantially hexagonal cross section and presents three rearwardly extending, interior friction surfaces 23—23—23 of V-shaped, transverse section, each surface being formed on two adjacent walls of the hexagonal, interior section of the shell. The friction surfaces 23 of the shell preferably converge inwardly of the same. At the forward end, the shell is provided with a set of three inwardly projecting stop lugs 24—24—24, which are spaced circumferentially of the shell, the same being alternated with the friction surfaces 23—23—23. In other words, one stop lug 24 is located between each set of adjacent friction surfaces. At the inner or rear end, the shell B has a pair of diametrically opposite, laterally outwardly extending retaining flanges 25—25, which are in the form of arc-shaped wings engageable within the guideways 17—17 of the arms 11 and 12 of the spring cage. Each arc-shaped flange 25 is of such a thickness that it will freely pass through the inlet opening 22 of the guideway of the corresponding arm of the spring cage, when the shell is rotated to enter said flange in edgewise direction. The flange or wing 25 is of such a width that it slidingly fits between the walls 18 and 19 of said guideway 17 for movement lengthwise of the mechanism.

The friction shoes D—D—D are slidingly arranged within the shell B. Each shoe D has a lengthwise extending friction surface 26 on the outer side of V-shaped, transverse section, engaging the corresponding V-shaped friction surface 23 of the friction shell and correspondingly inclined thereto. On the inner side, each shoe has a flat wedge face 27 adapted to cooperate with the wedge block C. At the rear ends, the shoes D—D—D present flat, transverse abutment faces 28 for the spring elements E and F.

The wedge C is in the form of a hollow block having a flat, transverse, front or top end face 29 adapted to bear on the usual front follower of a railway draft rigging. On the outer sides thereof, the wedge block C has three inwardly converging, flat wedge faces 30—30—30 correspondingly inclined to, and engaging with the wedge faces 27—27—27 of the shoes D—D—D, respectively. At the rear end, the block C is provided with three radially outwardly projecting retaining lugs 31—31—31, which extend between adjacent shoes and are engaged in back of the corresponding stop lugs 24—24—24 of the friction shell to limit outward movement of the wedge with respect to the shell.

The spring resistance of the mechanism is composed of the inner spring E and outer spring F, which springs are disposed within the cage A and have their front or upper ends bearing on the inner ends of the shoes D—D—D. The springs E and F are in the form of helical coils, the spring F being the heavier and surrounding the spring E. The outer spring F is of such outer diameter that it clears the inner end of the friction shell B and bears only on the shoes D—D—D. The coils of both springs E and F are right hand, as illustrated in Figure 1, that is, the springs are coiled in the right hand direction and thus exert rotary forces, when being compressed, which tend to rotate the friction shell B in clockwise direction, as seen in Figure 2, the tangs at the outer ends of these springs, which bear on the shoes, creeping in clockwise direction, thereby urging the shoes to move in the same direction, and the shoes forcing the shell B in said direction. The flanges 25—25 of the shell B are thus maintained within the guideways 17—17 when said flanges become aligned with the inlet openings 22—22 of the guideways. The springs E and F are preferably under initial compression in the assembled condition of the mechanism.

In assembling the mechanism, the wedge and shoes are first assembled with the friction shell B with the lugs 31 of the wedge disposed in back of the stop lugs 24 of the friction shell. The springs E and F are then placed within the spring cage A and the friction shell applied to the cage by arranging the flanges 25—25 thereof in longitudinal alignment with the openings between the arms 11 and 12 of the cage and forcing the shell lengthwise inwardly against the resistance of the springs E and F, until the flanges of the shell reach a position of transverse alignment with the inlet openings 22—22 of the guideways 17—17. The shell is then given a partial turn in clockwise direction, as viewed in Figure 2, to seat the flanges 25—25 thereof in the guideways. The pressure is then removed from the friction shell, permitting the springs to project the shell outwardly until the retaining flanges 25—25 engage the stop flanges 21—21 of the cage. Outward movement of the shell is thus positively limited and the flanges 25—25 thereof are confined between the side walls 18 and 19 of the arms of the cage. As will be evident, the shell is thus restricted to lengthwise movement with respect to the cage.

In the operation of my improved shock absorbing mechanism, during compression thereof, the wedge C and the shoes D—D—D are forced inwardly of the cage, against the resistance of the springs E and F, and, due to the friction existing between the shoes and the shell, the shell is carried inwardly of the cage in unison with the shoes until the inner end of the shell comes into engagement with the stop flange or wall 15 of the cage, whereupon further inward movement of the shell is arrested. Upon movement of the shell being arrested, the wedge and shoes are compelled to move inwardly of the shell as the mechanism is being further compressed, thereby providing high frictional resistance during the remainder of the compression stroke. Inasmuch as the springs E and F, while being compressed, exert a rotary force on the friction shoes D which is transmitted to the friction shell B, accidental turning of the shell in disengaging direction is effectively prevented when the mechanism has been compressed to an extent to place the flanges 25—25 of the shell in a position of transverse alignment with respect to the inlet openings of the guideways. It is further pointed out that the parts are so designed that the inner end of the friction shell engages and bears on the stop flange 15 of the cage at the instant that the flanges 25—25 of the former reach their position of alignment with the inlet openings of the guideways, and that accidental rotation of the shell is thus further opposed by the friction between the shell and the flange 15 of the cage. Compression of the mechanism is limited when the wedge C is forced inwardly of the shell to such an extent that the pressure transmitting member or follower which bears on the wedge, contacts the outer end of the friction shell. The pressure is then transmitted directly through the shell to the spring cage, these parts acting as a solid column to transmit the load. In this connection it is pointed out that the relatively large contacting areas of the friction shell and flange 15 of the cage add greatly to the column strength of the mechanism when the same has been compressed solid.

When the actuating force is reduced, the expansive action of the springs E and F, which bear on the shoes, returns all of the parts to the normal full release position shown in Figure 1, the shoes being forced outwardly directly by the springs and, due to their frictional engagement with the shell B, carrying the latter outwardly therewith until stopped by the flanges 21—21 of the cage, whereupon the shoes D and the wedge block C will be projected outwardly of the shell until movement of the wedge block is positively arrested by engagement with the lugs 24—24 of the friction shell.

I claim:

1. In a friction shock absorbing mechanism, the combination with a spring cage member; of a friction shell member slidable lengthwise with respect to the cage member; a friction clutch slidable within the friction shell member; spring means within the cage member yieldingly opposing inward movement of the clutch with respect to the cage member; stop means on the cage member with which said shell member is engageable for limiting inward movement of the shell member to less than the full compression stroke of the mechanism; and cooperating guide means on the shell and cage members for restricting said shell member to lengthwise movement with respect to the cage member, including a guide flange on one of said members and spaced guide walls on the other of said members between which said flange is slidingly engaged, one of said walls being interrupted at one end thereof to provide an inlet opening through which said flange may freely pass in edgewise direction, said opening being of a size to permit edgewise passage of said flange only when the shell member is in contact with said stop means of the cage member.

2. In a friction shock absorbing mechanism, the combination with a spring cage member; of a friction shell member slidable lengthwise with respect to the cage member; a friction clutch slidable within the friction shell member; spring means within the cage member yieldingly opposing inward movement of the clutch with respect to the cage member; a stop shoulder on the cage member with which said shell member is engageable to limit inward movement of the latter to less than the full compression stroke of the mechanism; and cooperating guide means on the shell and cage members for restricting said shell member to lengthwise movement with respect to the cage member, including a guide flange on one of said members, and a pair of spaced guide walls on the other of said members between which said flange slidingly fits, one of said walls being interrupted to provide an inlet opening through which said guide flange may freely pass in edgewise direction, said opening being of a size to permit edgewise passage of said flange only when the shell member engages said stop shoulder of the cage member.

3. In a friction shock absorbing mechanism, the combination with a spring cage; of a friction shell slidable lengthwise with respect to the cage; a friction clutch slidable within said shell; spring means within the cage yieldingly opposing inward movement of the clutch with respect to the cage; a stop ledge on the cage with which the inner end of the shell is engageable to limit inward movement of the latter to less than the full compression stroke of the mechanism; a guide flange on the shell; and a pair of lengthwise extending, spaced guide walls on said cage between which said flange slidingly fits, one of said walls being interrupted at its inner end to provide an inlet opening through which said flange may freely pass in edgewise direction, said opening being of a size to permit edgewise passage of said flange only when the shell is in engagement with said stop ledge.

4. In a friction shock absorbing mechanism, the combination with a spring cage; of a friction shell slidable lengthwise with respect to the cage; a friction clutch slidable within said shell; spring means within the cage yieldingly opposing inward movement of the clutch with respect to the cage; a stop ledge on the cage with which the inner end of the shell is engageable to limit inward movement of the latter to less than the full compression stroke of the mechanism; a guide flange on the shell; and a pair of lengthwise extending, spaced guide walls on said cage between which said flange slidingly fits, one of said walls being interrupted at its inner end to provide an inlet opening through which said flange may freely pass in edgewise direction to respectively permit engagement and disengagement of the shell when turned in reverse directions, said opening terminating at said stop ledge and being of a size to permit edgewise passage of said flange only when the shell is in engagement with said stop ledge.

5. In a friction shock absorbing mechanism, the combination with a spring cage; of a friction shell slidable lengthwise with respect to the spring cage; a friction clutch slidable within said shell; cooperating guide means on the shell and cage for restricting said shell to lengthwise movement with respect to the cage, said shell being engageable with and disengageable from the guide means of the cage by rotation of the shell respectively in reverse directions with respect to the cage; and helical spring means within the cage yieldingly opposing inward movement of the shell and clutch with respect to the cage, the coils of said helical spring means being wound in a direction corresponding to the direction of rotary movement of the flange of the shell in being engaged within the guide means of the cage, whereby said coils wind in said last named direction during compression of the mechanism to exert rotary force on said friction clutch and shell opposing rotation of the shell in disengaging direction.

6. In a friction shock absorbing mechanism, the combination with a spring cage; of a friction shell slidable lengthwise with respect to the cage; a friction clutch slidable within said shell; a guide flange on said shell; a guideway on said cage within which said flange is slidingly engaged, said guideway having an inlet opening through which said flange may freely pass in edgewise direction, said shell being rotatable in reverse directions to respectively engage the flange of the same within the guideway of the cage and disengage the same therefrom; and helical coil spring means within the cage yieldingly opposing inward movement of the shell and clutch with respect to the cage, said helical coil spring means being coiled in a direction corresponding to the direction of rotary movement of the flange of the shell in being engaged within the guideway of the cage, whereby said spring means winds in said last named direction during compression of the mechanism to exert a rotary force on the friction shell opposite to the direction of rotary disengagement of the shell.

HARVEY J. LOUNSBURY.

REFERENCES CITED

The following references are of record in the file of this patent:

UNITED STATES PATENTS

| Number | Name | Date |
| --- | --- | --- |
| 1,620,630 | Brenne | Mar. 15, 1927 |
| 1,650,439 | Geiger | Nov. 22, 1927 |
| 1,689,291 | O'Connor | Oct. 30, 1928 |
| 2,354,826 | Olander | Aug. 1, 1944 |